United States Patent
Cao et al.

(10) Patent No.: US 9,502,405 B1
(45) Date of Patent: Nov. 22, 2016

(54) SEMICONDUCTOR DEVICE WITH AUTHENTICATION CODE

(71) Applicant: International Business Machines Corporation, Armonk, NY (US)

(72) Inventors: Qing Cao, Yorktown Heights, NY (US); Kangguo Cheng, Schenectady, NY (US); Zhengwen Li, Scarsdale, NY (US); Fei Liu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/837,707

(22) Filed: Aug. 27, 2015

(51) Int. Cl.
| | |
|---|---|
| G06F 21/73 | (2013.01) |
| H01L 27/088 | (2006.01) |
| H01L 21/66 | (2006.01) |
| H01L 21/8234 | (2006.01) |
| H01L 21/768 | (2006.01) |
| H01L 21/311 | (2006.01) |
| H01L 23/528 | (2006.01) |
| H01L 27/02 | (2006.01) |
| H01L 23/58 | (2006.01) |

(52) U.S. Cl.
CPC ............. *H01L 27/088* (2013.01); *G06F 21/73* (2013.01); *H01L 21/31144* (2013.01); *H01L 21/76802* (2013.01); *H01L 21/823475* (2013.01); *H01L 22/00* (2013.01); *H01L 22/14* (2013.01); *H01L 22/20* (2013.01); *H01L 23/528* (2013.01); *H01L 23/58* (2013.01); *H01L 27/0207* (2013.01)

(58) Field of Classification Search
CPC ....... H01L 22/00; H01L 22/14; H01L 22/20; G06F 21/73
See application file for complete search history.

(56) References Cited

U.S. PATENT DOCUMENTS

| 4,766,516 | A * | 8/1988 | Ozdemir | G06F 21/73 257/E27.009 |
|---|---|---|---|---|
| 5,530,749 | A * | 6/1996 | Easter | G01R 31/31719 380/277 |
| 5,787,190 | A * | 7/1998 | Peng | H01L 22/20 257/E21.525 |
| 6,681,376 | B1 * | 1/2004 | Balasinski | H01L 22/20 257/E21.525 |
| 7,059,533 | B2 * | 6/2006 | Van Rens | G06F 21/73 235/492 |
| 7,210,634 | B2 * | 5/2007 | Sapiro | G06F 21/73 235/375 |

(Continued)

OTHER PUBLICATIONS

Wikipedia, "Physical Unclonable Function," https://en.wikipedia.org/w/index.php?title=Physical_unclonable_function&printable=yes, Jul. 16, 2015, 5 pages.

(Continued)

*Primary Examiner* — Evan Pert
(74) *Attorney, Agent, or Firm* — Vazken Alexanian; Ryan, Mason & Lewis, LLP

(57) ABSTRACT

A plurality of contact trenches are formed in a semiconductor structure. The plurality of contact trenches are formed with a contact opening width selected to result in improper contact trench formation in a random number of the plurality of contact trenches. Devices are formed from the semiconductor structure using the plurality of contact trenches, wherein devices formed with improperly formed contact trenches are defective and devices formed with properly formed contact trenches are not defective. One or more measurements are performed to determine which devices are defective and which devices are not defective. The results of the measuring step represent a unique authentication code for an integrated circuit in which the devices are formed. Advantageously, the unique authentication code represents a physically unclonable function.

20 Claims, 5 Drawing Sheets

(56) References Cited

U.S. PATENT DOCUMENTS

| | | |
|---|---|---|
| 8,159,260 B1 | 4/2012 | Behrends et al. |
| 8,176,106 B2 | 5/2012 | Schrijen et al. |
| 8,290,150 B2 | 10/2012 | Erhart et al. |
| 8,750,502 B2 | 6/2014 | Kirkpatrick et al. |
| 8,850,608 B2 | 9/2014 | Tehranipoor et al. |
| 2012/0081143 A1 | 4/2012 | Behrends et al. |
| 2014/0327468 A1 | 11/2014 | Pfeiffer et al. |
| 2014/0327469 A1 | 11/2014 | Pfeiffer et al. |
| 2015/0084193 A1 | 3/2015 | Feng et al. |

OTHER PUBLICATIONS

S.L. Lai et al., "Aspect Ratio Dependent Etching Lag Reduction in Deep Silicon Etch Processes," Journal of Vacuum Science & Technology, Jul./Aug. 2006, pp. 1283-1288, vol. 24, No. 4.

O. Joubert et al., "Fluorocarbon High Density Plasma. VI. Reactive Ion Etching Lag Model for Contact Hole Silicon Dioxide Etching in an Electron Cyclotron Resonance Plasma," Journal of Vacuum Science & Technology, May/Jun. 1994, pp. 665-670, vol. 12, No. 3.

* cited by examiner

100

120

140

200

SEMICONDUCTOR DEVICE WITH AUTHENTICATION CODE

BACKGROUND

Integrated circuit (or semiconductor device) authentication is becoming more and more critical for cloud and mobile applications. Due to the proliferation of computing devices (e.g., laptops, tablets, smartphones, etc.), applications and systems that operate or otherwise manage access by such computing systems seek to ensure proper identification of the computing devices that attempt to gain access. Further, in any communication session, one device typically seeks to ensure it is actually communicating with the entity that the other device purports to be. This can be accomplished via providing at least one integrated circuit in a computing device with a unique authentication code. That is, during initial communication or access steps, the authentication code can be obtained and verified to confirm the identity of the computing device seeking access or connection.

SUMMARY

Embodiments of the invention provide techniques for forming semiconductor devices with authentication codes. For example, in one embodiment, a method comprises the following steps. A plurality of contact trenches are formed in a semiconductor structure. The plurality of contact trenches are formed with a contact opening width selected to result in improper contact trench formation in a random number of the plurality of contact trenches. Devices are formed from the semiconductor structure using the plurality of contact trenches, wherein devices formed with improperly formed contact trenches are defective and devices formed with properly formed contact trenches are not defective. One or more measurements are performed to determine which devices are defective and which devices are not defective. The results of the measuring step represent a unique authentication code for an integrated circuit in which the devices are formed.

DETAILED DESCRIPTION

Figure 1A:
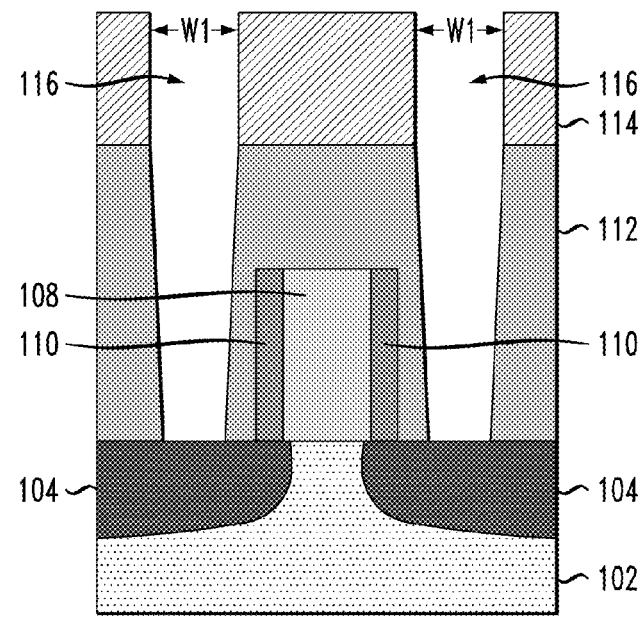
FIG. 1A is a cross-sectional side view of a field effect transistor device during formation in which source/drain contact trenches having a first contact opening width have been etched prior to contact metallization, according to an embodiment of the invention.

Embodiments will now be described in further detail with regard to techniques for forming semiconductor devices with authentication codes. It is to be understood that the various layers, structures, and/or regions shown in the accompanying drawings are illustrations that are not necessarily drawn to scale. In addition, for ease of explanation, one or more layers, structures, and/or regions of a type commonly used to form semiconductor devices or structures may not be explicitly shown in a given drawing. This does not imply that any layers, structures, and/or regions not explicitly shown are omitted from the actual semiconductor devices or structures.

Furthermore, it is to be understood that the embodiments discussed herein are not limited to the particular materials, features, and processing steps shown and described herein. In particular, with respect to semiconductor processing steps, it is to be emphasized that the descriptions provided herein are not intended to encompass all of the processing steps that may be used to form a functional semiconductor integrated circuit device. Rather, certain processing steps that are commonly used in forming semiconductor devices, such as, for example, wet cleaning and annealing steps, are purposefully not described herein for economy of description.

Moreover, the same or similar reference numbers are used throughout the drawings to denote the same or similar features, elements, layers, regions, or structures, and thus, a detailed explanation of the same or similar features, elements, layers, regions, or structures will not be repeated for each of the drawings. It is to be understood that the terms "about" or "substantially" as used herein with regard to thicknesses, widths, percentages, ranges, etc., are meant to denote being close or approximate to, but not exactly. For example, the term "about" or "substantially" as used herein implies that a small margin of error is present such as, for example, 1% or less than the stated amount. Also, in the figures, the illustrated scale of one layer, structure, and/or region relative to another layer, structure, and/or region is not necessarily intended to represent actual scale.

It is to be further understood that since, for a field effect transistor structure during formation, an active region can be designated as a drain active region or a source active region, reference is made herein to "source/drain" active regions (and thus source/drain contacts and source/drain contact trenches) to denote the interchangeable designation. This means that one of the contacts/contact trenches/active regions is associated with the drain, and the other with the source.

As will be illustratively explained herein, contact trenches are formed in a semiconductor structure. The contact trenches are formed with a contact opening width selected to result in improper contact trench formation in a random number of the contact trenches. Devices, such as but not limited to, metal oxide semiconductor, field effect transistors (MOSFETs), are formed from the semiconductor structure using the plurality of contact trenches. The devices formed with improperly formed contact trenches are defective and devices formed with properly formed contact trenches are not defective. One or more measurements are performed to determine which devices are defective and which devices are not defective. The results of the measuring step represent a unique authentication code for an integrated circuit in which the devices are formed.

Advantageously, the unique authentication code represents a physically unclonable function (PUF). Such a PUF is difficult to attack, randomly generated, and low cost to produce, i.e., relatively easy to implement but practically impossible to duplicate. Conventional approaches for implementing a PUF require additional process steps and thus increase process cost and complexity. Since the process of forming devices for the authentication code can be part of the fabrication process for forming other functional devices (i.e., devices not used for providing an authentication code) on the integrated circuit, a cost-effective way to fabricate integrated circuits with PUF MOSFETs is provided according to illustrative embodiments.

Illustrative embodiments for forming devices for providing a PUF on an integrated circuit will be described below with reference to FIGS. 1A, 1B, 1C, 2A, 2B, 2C, 3A, 3B, 3C, 4A and 4B. Each of the semiconductor structures 100 through 400 detailed in the figures illustrates steps which are used in the process of providing an authentication code representing a PUF on an integrated circuit.

Given the illustrative teachings herein, one of ordinary skill in the art will appreciate an appropriate order in which various structures, layers, and/or regions in FIGS. 1A through 3C can be formed. Also, where dimensions and materials are not expressly stated for a given structure, layer, and/or region, it is to be understood that they may be selected based on standard semiconductor practices by those of ordinary skill in the art.

FIG. 1A illustrates a MOSFET structure 100 prior to source/drain contact metallization. MOSFET structure 100 comprises a silicon substrate 102, source/drain active regions (diffusions) 104, gate 108, spacers 110, interlayer dielectric (ILD) 112, resist mask 114 and source/drain contact trenches 116. Resist mask 114 enables an etching process such as, for example, reactive ion etching (RIE), to form the contact trenches 116 to enable contact metallization of the source/drain. In structure 100, the resist mask 114 provides contact openings for etching the source/drain contact trenches having a first contact opening width W1. The first contact opening width W1 is sufficiently wide to ensure, over one or more process variations, that the etching process will provide a trench deep enough to reach the source/drain active regions 104. This ensures that the contact trench is properly formed and thus the further step of contact metallization will provide a proper conductive connection with the source/drain active regions 104. The first contact opening width W1 (for contact trenches 116) is utilized for forming contact trenches for MOSFETs, on an integrated circuit formed therewith, that are used for functions of the integrated circuit other than a PUF for authentication. Besides resist, the mask 114 can be a hard mask.

It is to be appreciated that etching of contact trenches has an inherent etch rate variation due to contact opening size variation. This effect is known as aspect ratio dependent etching (ARDE). The aspect ratio of a feature is equivalent to its depth divided by its width. Thus, as the feature width decreases, the aspect ratio increases. The effect of ARDE provides that as the aspect ratio increases (due to decreasing width), the etch rate of the feature decreases. So for a substantially constant etch time, a first contact trench having a larger contact opening than a second contact trench will have a faster etch rate. Thus, the first contact trench will have a deeper trench than the second contact trench. Illustrative embodiments utilize this effect to intentionally form contact trenches with a contact opening width selected to result in improper contact trench formation in a random number of the contact trenches.

Figure 1B:
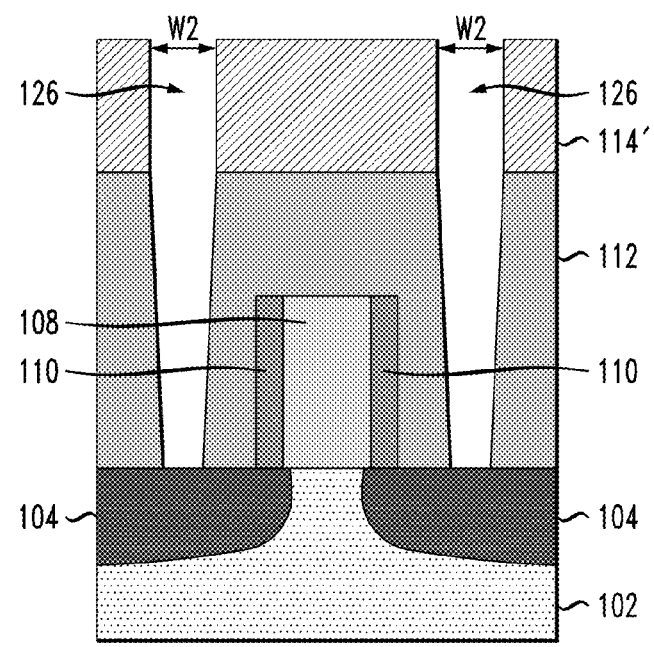
FIG. 1B is a cross-sectional side view of a field effect transistor device during formation in which source/drain contact trenches having a second contact opening width have been etched prior to contact metallization, according to an embodiment of the invention.
Figure 1C:
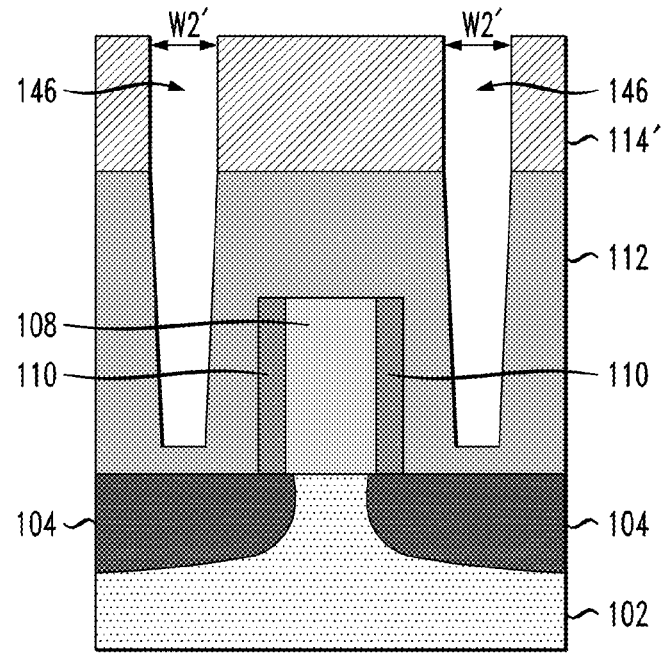
FIG. 1C is a cross-sectional side view of a field effect transistor device during formation in which source/drain contact trenches having a variation of the second contact opening width have been etched prior to contact metallization, according to an embodiment of the invention.

FIGS. 1B and 1C illustrate MOSFET structures 120 and 140, respectively, each having a contact opening in the resist mask 114' smaller than the contact opening in the resist mask 114 of structure 100 illustrated in FIG. 1A. Taking advantage of the ARDE effect, the contact opening size is intentionally designed smaller (relative to W1 in FIG. 1A) such that depending on, for example lithographic and/or RIE variations, a random number of MOSFETs with the smaller contact opening will have contact trenches that do not reach the surface of the source/drain active regions 104, while the remaining MOSFETs with the smaller contact opening will have contact trenches reaching the surface of the source/drain active regions 104. The MOSFET structures 120 and 140 are used as part of the authentication code for the PUF of the integrated circuit on which they are formed.

More particularly, FIG. 1B illustrates MOSFET structure 120 wherein the contact opening in resist mask 114' is intentionally made smaller (than W1) with an opening having a second contact opening width of W2. In this particular instance, as a result of the etching process, a source/drain contact trench 126 is formed which is deep enough to reach the upper surface of the source/drain active region 104. While the source/drain contact opening of trenches 116 of structure 100 (FIG. 1A) may have a first width of about 20 nanometers (nm) to 50 nm, the source/drain contact opening of trenches 126 of structure 120 (FIG. 1B) has a second width W2 which may be about 10 nm smaller than the first width W1. Due to ARDE, the reduction in the size of the openings in resist mask 114' results in a shallower contact trench 126 after the etching process. In structure 120 illustrated in FIG. 1B, despite the smaller contact opening, the depth of the contact trench 126 is still deep enough such that the contact metallization will make proper conductive connection with the source/drain active regions 104.

While the contact trenches 126 of structure 120 shown in FIG. 1B are deep enough to reach the upper surface of source/drain active regions 104, changes to the depth of the contact trenches may be affected by process variations due to selection of width W2. Such variations may include variations in the lithographic process and/or the etching process. FIG. 1C illustrates MOSFET structure 140, which has the same source/drain contact opening in resist mask 114' of second width W2 as does MOSFET structure 120 in FIG. 1B. However, in this particular instance, due to variations in the lithographic process, the contact opening in resist mask 114' randomly results in an opening having a variation of width W2, denoted as width W2', which is marginally smaller than second width W2. W2' may be 10-20% smaller than W2. As an example, W2 can be about 20 nm and W2' is about 3 nm smaller than W2. Due to the marginal narrowing of the source/drain contact opening in resist mask 114', the etching process results in a source/drain trench that does not etch deep enough through the interlayer dielectric 112 to reach the top surface of the source/drain active regions 104. A further step of contact metallization will therefore fail to make conductive connection with the source/drain active regions 104. The failure of the contact metallization to make contact with the source/drain results in the MOSFET being defective, that is always permanently in an open (non-conductive) state.

It is to be noted that variations in the etching process, with or without the combination of lithographic process variations, may also result in a failure of the contact trench to be etched deep enough to ensure proper conductive connection of the contact metallization with the source/drain active regions. This means that even if the contact opening width in structure 140 turned out to be W2 rather than W2', the contact trench may still fail to reach the active region because of inherent variations in the etching process.

Figure 2A:
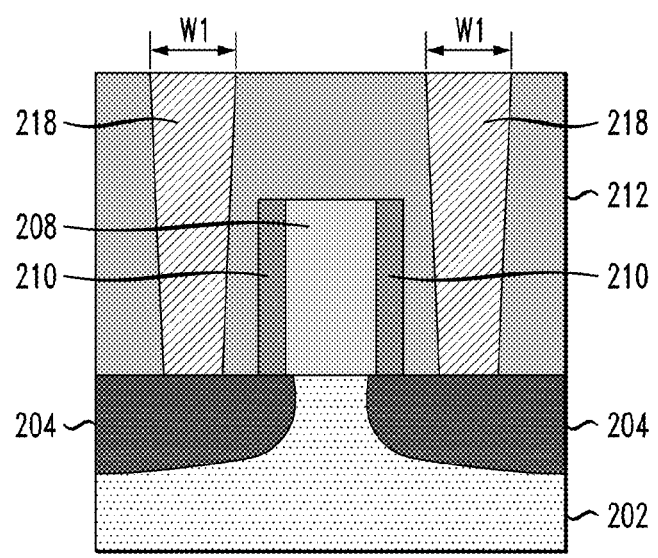
FIG. 2A is a cross-sectional side view of a field effect transistor device during formation in which source/drain contact trenches having the first contact opening width have contacts deposited therein following contact metallization, according to an embodiment of the invention.
Figure 2B:
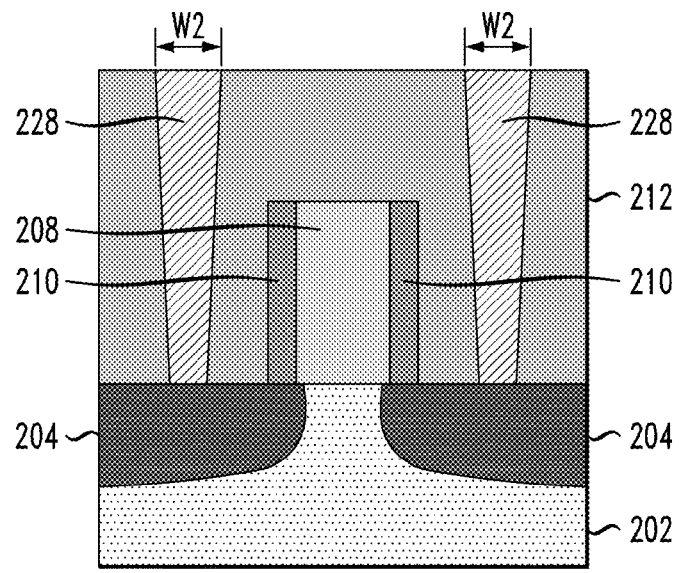
FIG. 2B is a cross-sectional side view of a field effect transistor device during formation in which source/drain contact trenches having the second contact opening width have contacts deposited therein following contact metallization, according to an embodiment of the invention.
Figure 2C:
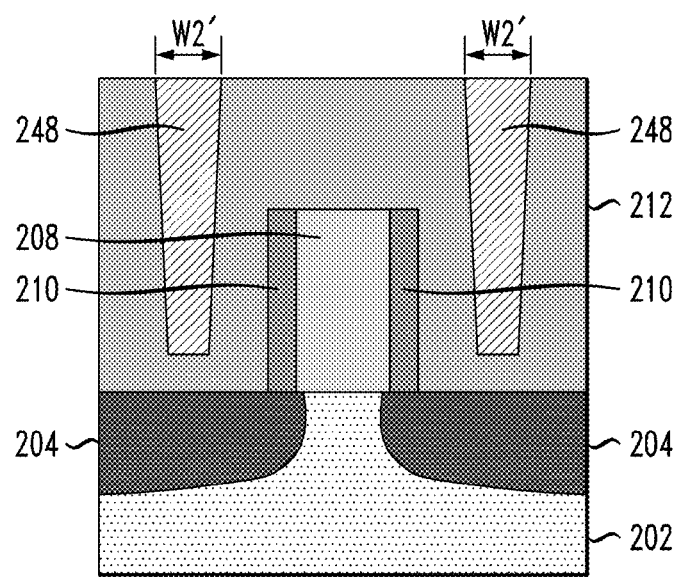
FIG. 2C is a cross-sectional side view of a field effect transistor device during formation in which source/drain contact trenches having the variation of the second contact opening width have contacts deposited therein contact metallization, according to an embodiment of the invention.

FIGS. 2A, 2B and 2C illustrate FIGS. 1A, 1B and 1C respectively after contact metallization. FIG. 2A illustrates a normal functioning MOSFET structure 200 (absent a gate contact which is not shown yet in the illustration) comprising a substrate 202, source/drain active regions (diffusions) 204, gate 208, spacers 210, interlayer dielectric (ILD) 212, and source/drain contact metallization (contacts) 218. Note again that the first width W1 of the contact openings prior to contact metallization is made large enough to ensure that, over process variation(s), the depth of the contact trenches resulting from the etching process will be deep enough to ensure the contact metallization will reach the source/drain. As mentioned above, this normal functioning MOSFET structure 200 is not used for the PUF-based authentication code.

FIG. 2B illustrates MOSFET structure 220, which shows MOSFET structure 120, shown in FIG. 1B, after contact metallization. The second width W2 of the contact openings prior to contact metallization is intentionally made smaller, wherein second width W2 is smaller than first width W1. However, as shown in FIG. 2B, the etching process still provides a contact trench deep enough such that the contact metallization 228 reaches the source/drain active regions 204.

FIG. 2C illustrates MOSFET structure 240, which shows MOSFET structure 140, shown in FIG. 1C, after contact metallization. Since the depth of the contact trenches failed to reach the top surface of the source/drain active regions 204, resulting from the etching process due to the process variation causing intended width W2 to actually be marginally smaller width W2', the contact metallization (contacts) 248 fails to contact the source/drain active regions, resulting in a defective MOSFET device.

Figure 3A:
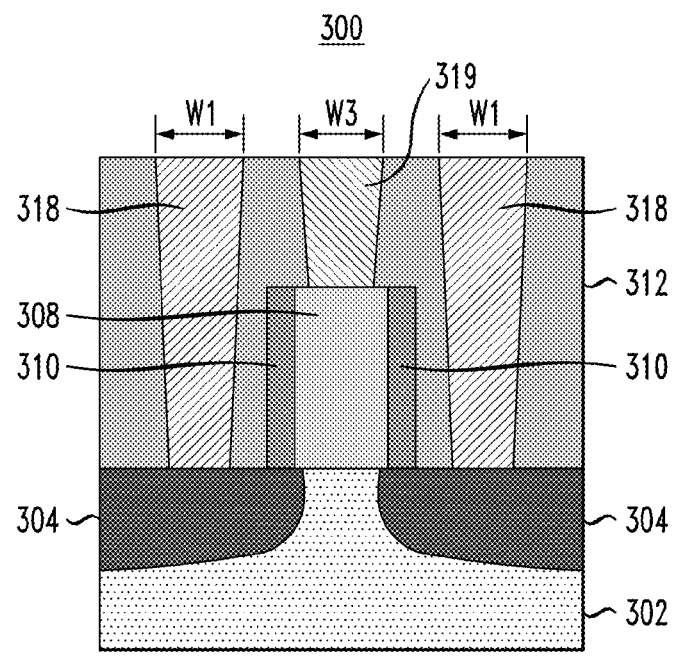
FIG. 3A is a cross-sectional side view of a field effect transistor device in which source/drain contact trenches having a first contact opening width and a gate contact trench having a third contact opening width have deposited therein contacts following contact metallization, according to an embodiment of the invention.
Figure 3B:
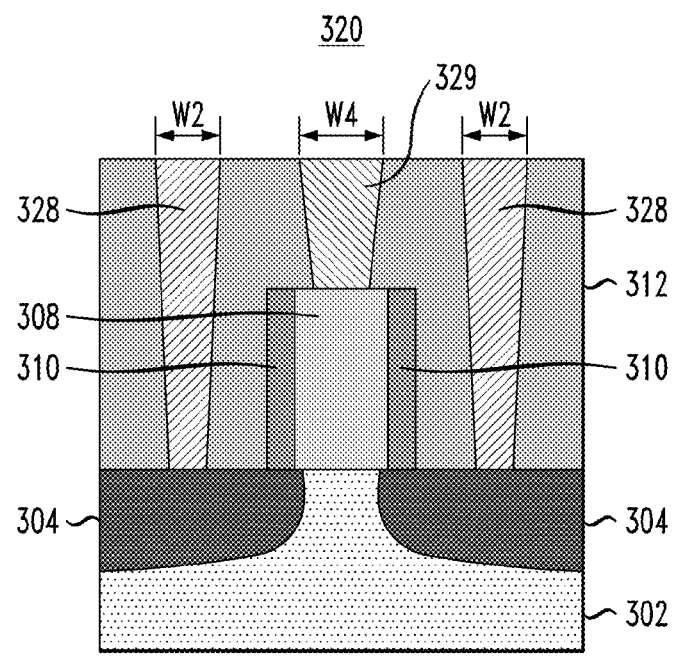
FIG. 3B is a cross-sectional side view of a field effect transistor device in which source/drain contact trenches having the second contact opening width and a gate contact trench having a fourth contact opening width have contacts deposited therein following contact metallization, according to an embodiment of the invention.
Figure 3C:
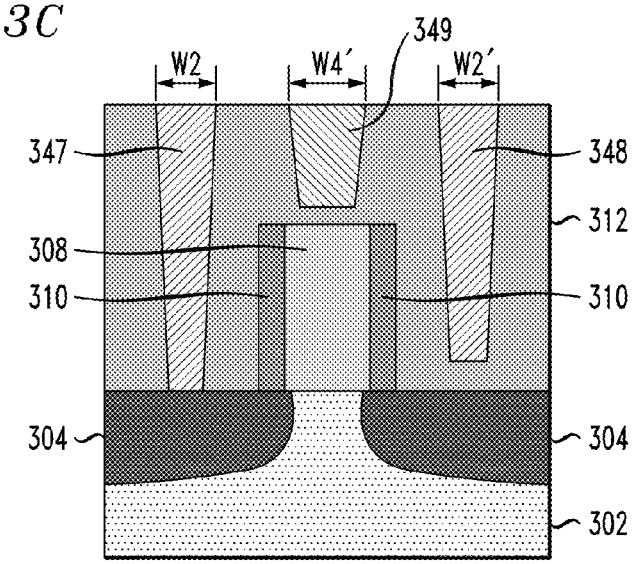
FIG. 3C is a cross-sectional side view of a field effect transistor device in which one source/drain contact trench having the second contact opening width, the other source/drain contact trench having a variation of the second contact opening width, and a gate contact trench having a variation of the fourth contact opening width have contacts deposited therein following contact metallization, according to an embodiment of the invention.

FIGS. 3A, 3B and 3C are similar to FIGS. 2A, 2B and 2C, respectively, but additionally include gate contacts 319, 329, and 349, respectively.

More particularly, FIG. 3A illustrates a normal functioning MOSFET structure 300 comprising a substrate 302, source/drain active regions (diffusions) 304, gate active region 308, spacers 310, interlayer dielectric (ILD) 312, source/drain contact metallization (contacts) 318, and gate contact metallization (contact) 319. Note that the first width W1 of the source/drain contact openings and a third width W3 of the gate contact opening prior to contact metallization is made large enough to ensure that, over process variation(s), the depth of the contact trenches resulting from the etching process will be deep enough to ensure the contact metallization will reach the source/drain active regions 304 and gate active region 308. Again, as mentioned above for FIG. 2A, this normal functioning MOSFET structure 300 is not used for the PUF-based authentication code.

FIG. 3B illustrates MOSFET structure 320, in which the source/drain contact openings have a second width W2 and the gate contact opening has a fourth width W4. The widths W2 and W4 of the source/drain and gate contact openings, respectively, prior to contact metallization are intentionally made smaller, wherein second width W2 and W4 is smaller than first width W1 and W3, respectively. In an illustrative embodiment, W4 may be smaller than W3 about the same proportion that W2 is smaller than W1. As shown in FIG. 3B, the etching process still provides a source/drain contact trench deep enough such that the source/drain contact metallization 328 reaches the source/drain active regions 304. The etching process also still provides a gate contact trench deep enough such that the gate contact metallization 329 reaches the gate 308.

FIG. 3C illustrates MOSFET structure 340 in which variations in the lithography and/or etching processes, as described above in connection with FIG. 2C, results in one of the source/drain contacts 347 making contact with one of the source/drains active regions 304, while the second one of the source/drain contacts 348 fails to make conductive connection with the other of the source/drain active regions 304 due to the process variation causing intended width W2 to actually be marginally smaller width W2'. Further, variations in the lithography and/or etching processes may also result in the gate contact 349 failing to make conductive connection with the gate 308 caused by intended width W4 to actually be marginally smaller width W4'. W4' may be 10-20% smaller than W4. As an example, W4 can be about 20 nm and W4' is about 4 nm smaller than W4. Structure 340 represents a defective MOSFET device which, during operation, remains in an open (non-conductive) state.

It is to be appreciated that while various illustrative embodiments in FIGS. 1A through 3C depict multiple improperly formed contact trenches (i.e., both source and drain contact trenches in FIG. 2C, and one of the source/drain contact trenches and the gate contact trench in FIG. 3C), embodiments also include a structure with only one contact trench improperly formed. That is, the resulting MOSFET device will operate defectively (open or non-conductive state) if at least one contact trench is improperly formed.

Figure 4A:
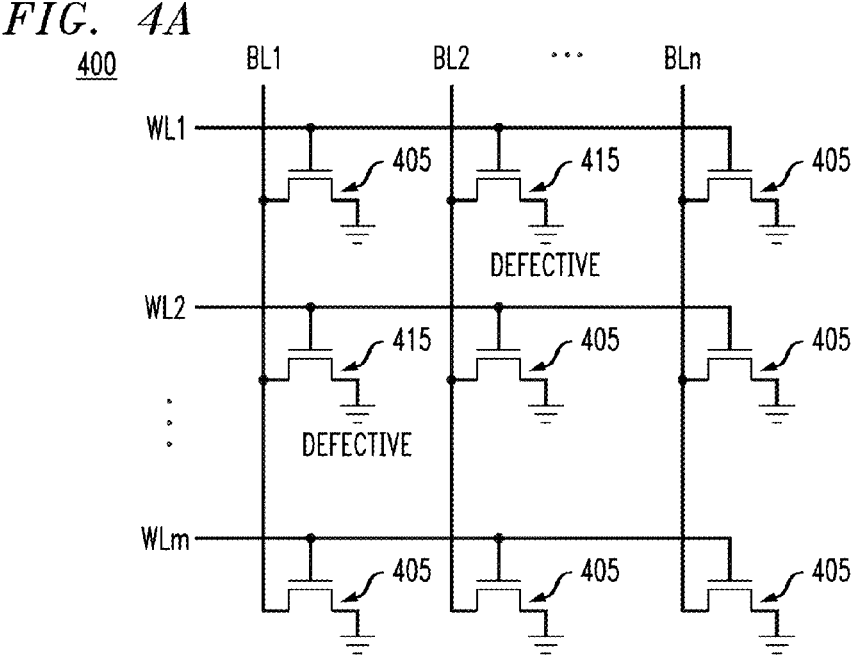
FIG. 4A is a schematic view of a field effect transistor device array providing an authentication code representing a physically unclonable function, according to an embodiment of the invention.
Figure 4B:
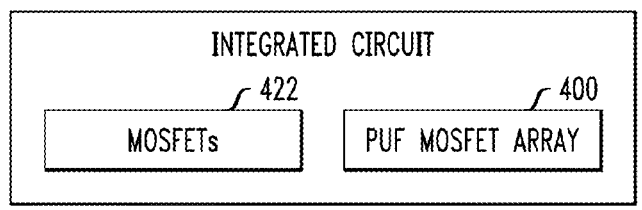
FIG. 4B is a diagrammatic view of an integrated circuit, according to an embodiment of the invention.

FIG. 4A illustrates a PUF-based structure 400 formed from an M×N array of MOSFET transistor devices used to generate an authentication code for an integrated circuit in which the array is formed. That is, in an illustrative embodiment, an integrated circuit 420, as shown in FIG. 4B, has array structure 400 of MOSFET devices for the specific purpose of providing an authentication code for the integrated circuit, while also having MOSFETs 422 that provide normal functioning (non-authentication purposes) for the integrated circuit. By way of example, MOSFET devices in array structure 400 can be formed as shown above for FIGS. 3B and 3C, and MOSFET devices 422 can be formed as shown for FIG. 3A.

The array structure 400 comprises MOSFET devices whose gates are connected to a plurality of word lines WL1-WLm, and whose drains are connected to a plurality of bit lines BL1-BLn as shown in FIG. 4A. In this illustrative embodiment, the sources of the MOSFET devices are connected to ground. Alternatively, they could be connected to a voltage source. As mentioned above, the array of MOSFET devices in structure 400 are designed such that a random number of the devices in the array have improperly formed contact trenches resulting in defective devices, e.g., as described in detail above and shown in FIGS. 2C and 3C. That is, due to selection of a smaller width (as compared with normal contact opening design) and inherent process variations, as explained above, contacts of some of the MOSFETs will always be open (non-conductive), and thus considered defective. Therefore, when voltage is applied to these MOSFETs by the word lines and bit lines, no current will be drawn through these devices. In the array 400, MOSFETs that are not defective are labeled 405, while MOSFETs that are defective are labeled 415.

By measuring the PUF FETs of array structure 400, a unique random authentication code is generated for the integrated circuit 420. In the example shown, assuming the bit lines are connected to a voltage source (logic "1"), the unique code includes a word associated with WL1 being read as: "0", "open", . . . , "0" for bit positions BL1 through BLn, where "0" represents a logic "0", and "open" represents a defective (non-conductive) state. Similarly, a word associated with WL2 is read as: "open", "0", . . . , "0", and a word associated with WLm is read as: "0", "0", . . . , "0". In combination, the array of bits represents a unique authentication code for the integrated circuit.

It is to be understood that the methods discussed herein for fabricating semiconductor structures can be incorporated within semiconductor processing flows for fabricating other types of semiconductor devices and integrated circuits with various analog and digital circuitry or mixed-signal circuitry. In particular, integrated circuit dies can be fabricated with various devices such as transistors, diodes, capacitors, inductors, etc. An integrated circuit in accordance with embodiments can be employed in applications, hardware, and/or electronic systems. Suitable hardware and systems for implementing embodiments of the invention may include, but are not limited to, personal computers, communication networks, electronic commerce systems, portable communications devices (e.g., cell phones), solid-state media storage devices, functional circuitry, etc. Systems and hardware incorporating such integrated circuits are considered part of the embodiments described herein.

Furthermore, various layers, regions, and/or structures described above may be implemented in integrated circuits (chips). The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Although illustrative embodiments have been described herein with reference to the accompanying drawings, it is to be understood that the invention is not limited to those precise embodiments, and that various other changes and modifications may be made by one skilled in art without departing from the scope or spirit of the invention.

What is claimed is:

1. A method comprising steps of:
   forming a plurality of contact trenches in a semiconductor structure, wherein the plurality of contact trenches are formed with a contact opening width selected to result in improper contact trench formation in a random number of the plurality of contact trenches;
   forming devices from the semiconductor structure using the plurality of contact trenches, wherein devices formed with improperly formed contact trenches are defective and devices formed with properly formed contact trenches are not defective; and
   measuring which devices are defective and which devices are not defective;
   wherein the results of the measuring step represent a unique authentication code for an integrated circuit in which the devices are formed.

2. The method of claim 1, wherein the devices are field effect transistors.

3. The method of claim 2, wherein the plurality of contact trenches are used to form one or more of drain contacts, source contacts, and gate contacts of the field effect transistors.

4. The method of claim 3, wherein for a given field effect transistor that is defective, at least one of the contact trenches respectively associated with a drain contact, a source contact, and a gate contact is improperly formed such that the at least one improperly formed contact trench causes the respective contact to fail to conductively connect with a corresponding active region of the given field effect transistor.

5. The method of claim 1, wherein the step of forming a plurality of contact trenches in a semiconductor structure further comprises:
   forming a mask having contact openings, wherein each contact opening has a width selected to result in improper contact trench formation in a random number of the plurality of contact trenches; and
   etching the plurality of contact trenches through the contact openings in the mask.

6. The method of claim 5, wherein, under a first process variation, the etching step forms contact trenches at a first depth that enables conductive connection between a contact and a corresponding active region.

7. The method of claim 6, wherein, under a second process variation, the etching step forms contact trenches at a second depth that fails to enable conductive connection between a contact and a corresponding active region.

8. The method of claim 7, wherein the second process variation is at least caused by a variation in a lithographic process.

9. The method of claim 7, wherein the second process variation is at least caused by a variation in the etching step.

10. The method of claim 1, wherein the unique authentication code represents a physically unclonable function.

11. A method comprising steps of:
forming a plurality of field effect transistor devices in an integrated circuit, wherein the plurality of field effect transistor devices are formed with a set of contact trenches with a contact opening width selected to result in improper contact trench formation in a random number of the plurality of contact trenches;
applying gate voltage to the plurality of devices; and
determining which devices conduct drain to source current, and which devices fail to conduct drain to source current due to at least one improperly formed contact trench; and
identifying a unique authentication code for the integrated circuit based on the determination step.

12. The method of claim 11, wherein for a given field effect transistor device that fails to conduct drain to source current, at least one of the contact trenches respectively associated with a drain contact and a source contact is improperly formed during the device forming step.

13. The method of claim 11, wherein the set of contact trenches are formed by:
forming a mask having contact openings, wherein each contact opening has a width selected to result in improper contact trench formation in a random number of the set of contact trenches; and
etching the set of contact trenches through the contact openings in the mask.

14. The method of claim 11, wherein the unique authentication code represents a physically unclonable function.

15. An integrated circuit, comprising:
a plurality of field effect transistor devices; wherein the plurality of field effect transistors are formed with a set of contact trenches with a contact opening width selected to result in improper contact trench formation in a random number of the set of contact trenches such that devices formed with the improperly formed contact trenches are defective;
wherein the defective field effect transistor devices form a unique authentication code for the integrated circuit.

16. The integrated circuit of claim 15, wherein the set of contact trenches are used to form one or more of drain contacts, source contacts, and gate contacts of the field effect transistor devices.

17. The integrated circuit of claim 16, wherein for a given field effect transistor device that is defective, at least one of the contact trenches respectively associated with a drain contact, a source contact, and a gate contact is improperly formed such that the at least one improperly formed contact trench causes the respective contact to fail to conductively connect with a corresponding active region of the given field effect transistor device.

18. The integrated circuit of claim 15, wherein forming the set of contact trenches further comprises: forming a mask having contact openings, wherein each contact opening has a width selected to result in improper contact trench formation in a random number of the set of contact trenches; and etching the set of contact trenches through the contact openings in the mask.

19. The integrated circuit of claim 18, wherein, under a first process variation, the etching step forms contact trenches at a first depth that enables conductive connection between a contact and a corresponding active region.

20. The integrated circuit of claim 19, wherein, under a second process variation, the etching step forms contact trenches at a second depth that fails to enable conductive connection between a contact and a corresponding active region.

* * * * *